Sept. 7, 1965        F. X. REES        3,204,322

ELECTRICAL SURGE BYPASS UNIT

Original Filed July 21, 1960        5 Sheets-Sheet 1

INVENTOR.
F.X.REES
BY
*Forest H. Hitchcock*
HIS ATTORNEY

Sept. 7, 1965    F. X. REES    3,204,322
ELECTRICAL SURGE BYPASS UNIT
Original Filed July 21, 1960    5 Sheets-Sheet 2

INVENTOR.
F.X.REES
BY
*Forest B. Whitlock*
HIS ATTORNEY

Sept. 7, 1965            F. X. REES            3,204,322

ELECTRICAL SURGE BYPASS UNIT

Original Filed July 21, 1960            5 Sheets-Sheet 3

AIR GAP BETWEEN METAL ELECTRODES

SEMICONDUCTOR BETWEEN ELECTRODE AIR GAP

COATED SEMICONDUCTOR BETWEEN ELECTRODE AIR GAP

INVENTOR.
F.X.REES
BY
*Forest B. Hitchcock*
HIS ATTORNEY

Sept. 7, 1965     F. X. REES     3,204,322
ELECTRICAL SURGE BYPASS UNIT
Original Filed July 21, 1960     5 Sheets-Sheet 4

INVENTOR.
F. X. REES
BY
HIS ATTORNEY

Sept. 7, 1965             F. X. REES             3,204,322
ELECTRICAL SURGE BYPASS UNIT
Original Filed July 21, 1960             5 Sheets-Sheet 5

FIG. 14.

*INVENTOR.*
F. X. REES
BY
*Forest D. Hitchcock*
HIS ATTORNEY

United States Patent Office
3,204,322
Patented Sept. 7, 1965

3,204,322
ELECTRICAL SURGE BYPASS UNIT
Frank X. Rees, deceased, late of Chili, N.Y., by Elsie G. Rees, executrix, Clayton, N.Y., assignor to General Signal Corporation, a corporation of New York
Continuation of application Ser. No. 44,832, July 21, 1960. This application Nov. 19, 1964, Ser. No. 414,504
5 Claims. (Cl. 29—25.11)

This application is a continuation of my prior application Ser. No. 44,832, filed July 21, 1960, and now abandoned, which application was a continuation-in-part of my prior copending application S.N. 747,745 also now abandoned.

My invention relates in general to electrical surge bypass devices, and more particularly to electrical surge bypass devices providing means to effect initial discharges at relatively low voltages and a method for producing such devices.

In using electrical apparatus in territories where lightning is very prevalent, it is the practice to employ lightning arrestors of the air-gap type to act as discharge paths to ground for the lightning. Although such arrestors are ordinarily effective to discharge voltages for which they are designed, the discharge time can still be sufficient to allow an excessive current to pass through the circuit or device to be protected. Also, in some cases the device to be protected will not withstand the voltages required to cause the associated lightning arrestors to initiate their discharges through their air gaps.

In one type of prior art lightining arrestor, two spaced metal electrodes are separated by a disc of refractory material such as carborundum, with the metal electrodes having teeth adjacent each other to provide spark gaps. These devices may be connected directly across the device or circuit to be protected; but, these devices also require relatively high voltages to initate a discharge, and in some instances the discharge voltages are sufficiently high, due to the character of the device, as to cause metal to be electrically dispersed through the pores or interstices of the refractory material separating the metal electrodes which are supposed to carry the main discharge current. Since such dispersion of the metal produces in effect a low resistance path between the metal electrodes (and thus across the device or circuit to be protected), this renders the device or circuit inoperative until renewed or repaired.

In view of the above, one purpose of the present invention is to provide an electrical surge bypass unit which is constructed with metal electrodes capable of efficiently handling relatively high discharge currents without burning or pitting the electrodes in combination with means effective to provide that a discharge can be initiated between such metal electrodes at a relatively low voltage.

Generally speaking, and without making any attempt to define the exact scope of the present invention, it is proposed to provide semiconductive material between two spaced metal electrodes in such a way that in the presence of potential between the metal electrodes, a current tends to flow adjacent to and along the surface of the semiconductive material in a way to initially effect the ionization of the air between the metal electrodes and allow a disruptive discharge of relatively low voltage to occur between the metal electrodes for dissipating the major portion of the discharge current.

Another object of the present invention is to so construct the electrical surge bypass device that the presence of relatively high potentials and discharge currents does not cause metal to disperse through the interstices of the semiconductive material between the metal electrodes.

Another object of the present invention is the provision of an electrical surge bypass unit structure which occupies a minimum of space, which is economical to manufacture, which is stable, and which at the same time is highly efficient.

Another object of the present invention is the provision of an electrical surge bypass unit provided with means to securely hold it in its mounting position requiring very little maintenance for a substantial period of time.

Another object of the present invention is the provision of an electrical surge bypass unit which may be placed in series with a number of like units to provide a protecting device for power lines against electrical surges in the line and yet effectively prevent power follow-through discharges.

Another object of this invention is to provide a method of producing an electrical surge bypass unit having the desired characteristics.

Another object of the present invention is the provision of apparatus for treating an electrical surge bypass unit to alter its original characteristics and checking that such altered characteristics conform to predetermined standards.

Other objects, purposes and characteristic features of the present invention will be in part obvious from the accompanying drawings, and in part pointed out as the description of the invention progresses.

In describing the invention in detail, reference will be made to the accompanying drawings, in which like reference characters designate corresponding parts throughout the several views, and in which:

FIGS. 12A, 12B and 12C show three graphs of voltage versus time for a multiple unit bypass device employing five electrical surge bypass units constructed in accordance with the principles of the present invention for use on power lines or the like;

In general, the electrical surge bypass unit of the present invention comprises a terminal block 10, a transparent hollow glass housing 11, and the electrodes 12, 13 and 14 which as an integral whole are held in position within the hollow glass housing 11 and are electrically connected to the terminals 15 and 16 of the terminal block 10.

The circular metallic electrode 12 (see FIG. 3) has a circular recess 17 for receiving a disc 14 of a suitable semiconductive material, for example, such as "Everohm" which is a trade name applied to a semiconductive product comprising powdered graphite or mineral black combined with a finely ground Portland cement binder as fully described in Patent No. 1,818,184 dated August 11, 1931. It is to be understood that other types of semiconductive material can be used if desired. However, it is desirable that the semiconductive material include some so called "free carbon" as compared to Carborundum which is silicon carbide where the carbon is fused with the silicon. The reasons for the presence of so called free carbon in the semiconductive material will be discussed later.

The disc 14 of semiconductive material is preferably of a relatively low ohmic resistance in the order of 200 to 1000 ohms depending upon the percentages of its physical ingredients which are selected in accordance with the service under which the unit is to be used. The circular electrode 12 has a through axial bore for receiving the stem of insulating material 23 such as Bakelite which stem has a through axial bore for receiving the shaft of a bolt 24 for mounting purposes as may be seen in FIG. 3.

Figure 3:
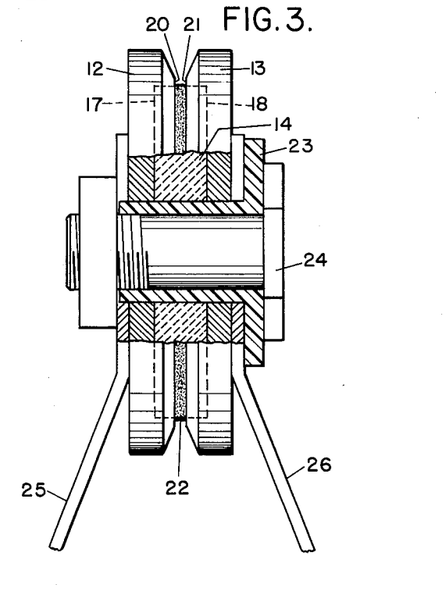
FIG. 3 is an enlarged view of the electrodes, metallic connectors, and connecting means shown in FIG. 2 with a portion of the electrodes broken away to show the connecting means and insulating bushings.

It can also be seen with reference to FIG. 3 that another circular metal electrode 13 shaped exactly the same as the electrode 12, but located in a reversed position, has a recess 18 for also partially receiving the disc 14 of semiconductive material.

The circular disc 14 of semiconductive material has an appropriate outside diameter to provide a press fit within the recesses 17 and 18 of the metal electrodes 12 and 13. This press fit is for the purpose of providing good electrical contact between the metal electrodes 12 and 13 and the semiconductive disc 14.

As can be seen in FIG. 3, the connectors 25 and 26, of suitable conductive material, are located adjacent to the metal electrodes 12 and 13 respectively. They are firmly held against the metal electrodes by the tightening of the bolt 24 to assure good electrical contact and prevent the development of explosive forces between the connectors 25 and 26 and their respective metal electrodes due to the presence of a disruptive discharge between them which might occur if good electrical contact were not provided. However, with the structure shown, suitable pressure can be developed by the bolt 24 to assure good electrical contact between all of the parts as required. The insulating bushing and washer 23 (an integral whole) provide adequate protection against undesired electrical breakdown between the parts of different potentials.

It is readily apparent that the thickness of the disc 14 determines the spacing between the metal electrodes 12 and 13, which spacing, of course, is selected in accordance with the particular service in which the unit is to be employed. As one example, the disc 14 may be of such a thickness as to provide that the flat surfaces 20 and 21 face each other at a separating distance of approximately twenty-five thousandths of an inch.

The metallic electrodes 12 and 13 have their surfaces slanted outwardly from the flat surfaces 20 and 21 at an angle of approximately twenty degrees, or less, to form a horn-shaped air space between the metal electrodes. The flat surfaces 20 and 21, of course, extend completely around the electrodes 12 and 13 directly adjacent the semiconductive disc 14 so that a considerable area is provided for the initiation of disruptive discharges between the two metal electrodes 12 and 13. Such an area thus provides that, upon the occurrence of disruptive discharges of electrical energy between the two metal electrodes, which always occurs at the shortest distance and at random, the heat developed by the current of the discharge can be quickly dissipated to the mass of the metal electrodes without unduly pitting the surfaces of the flat areas 20 and 21. This construction completely obviates the melting of the metal electrode material which might occur if they were brought to points or sharp edges.

Also, it can be seen that the surfaces 20 and 21 are directly adjacent the horn-shaped outwardly slanting surfaces, so that the disruptive electrical discharges between the electrodes 12 and 13 may readily travel outwardly and become quenched.

It is desirable to have the flat surfaces 20 and 21 separated by a suitable distance to prevent shorting by dust particles or the like. On the other hand, the use of a twenty-five thousandths of an inch spacing, as one example, would require under usual conditions a potential of approximately 1800 volts R.M.S. to cause a disruptive discharge. This would not provide the protection for low voltage devices intended. For this reason, the present invention proposes to treat the discs 14 in such a way that disruptive discharges may be initiated by potentials as low as 150 volts or even as low as 50 volts. Such treatment can be effected in at least two different methods herein described.

More specifically, after the electrodes 12 and 13 have been assembled with the related parts as shown in FIG. 3, a colloidal solution of graphite and alcohol is applied to the exposed surface 22 of the disc 14 by applying such solution with a brush or spraying it onto such exposed surface. This colloidal solution is then allowed to dry in air during which time some of the graphite solids of the colloidal solution enter the pores of the semi-conductor while other particles of graphite in the solution form a coating over the exposed surface of disc 14 as indicated at 22, which coating is closely adjacent to and in contact with the surfaces 20 and 21 of the metal electrodes 12 and 13. The alcohol of the solution, of course, evaporates.

One suitable colloidal graphtie solution is known as Dag Dispersion No. 154 as sold by the Acheson Colloids Corp., Port Huron, Michigan. This solution has a concentrate of twenty percent solids.

Figure 1:
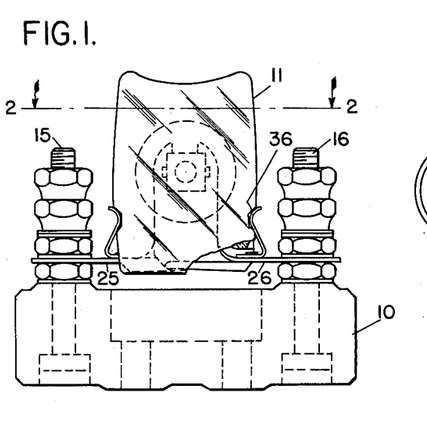
FIG. 1 is a side elevational view of the present invention comprising electrodes enclosed in a housing with associated metallic connectors extending to terminal posts of a terminal block.
Figure 2:
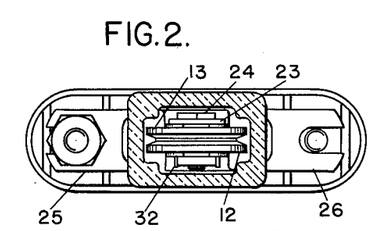
FIG. 2 is a cross sectional view taken on the line 2—2 of FIG. 1.

After the addition of the graphite coating as above described, the assembly of FIG. 3 is then mounted as shown in FIG. 1. More specifically, two metallic connectors 25 and 26 are provided to electrically connect the metallic electrodes 12 and 13 to the terminal posts 15 and 16 of the terminal block 10. Each metallic connector is provided with a cut-out portion 28 at one end having a width to suitably receive the stem of the insulator 23. The metallic connectors 25 and 26 are located, one between the flat circular disc of the insulating material 23 and metallic electrode 12 and the second between the square nut provided for the bolt 24 and the metallic electrode 13 (see FIG. 3). Two small portions 32 of metal are cut from the sides of the cut-out portion 28 and are bent perpendicularly to the end of the metallic connector 25 at their base so as to form a locking structure for the square nut provided for the bolt 24. A glass housing 11 is placed into position over the electrodes 12, 13 and 14 and their associated holding and connecting means. The glass housing 11 when inserted into its protective position receives resilient mounting springs 30 into elongated recesses 36 provided to hold the glass housing 11 in its protective position.

Figure 5:
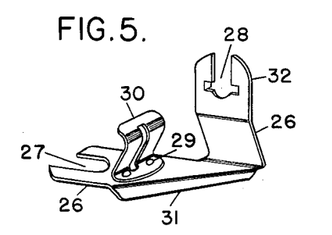
FIG. 5 is a perspective view of one of the metallic connectors shown in FIG. 4 and is used to electrically connect the electrodes of the electrical surge bypass unit to their respective terminal posts.

The metallic connector is shown in perspective in FIG. 5. Each of these metallic connectors is provided with a base having at one end a cut-out portion 27, a resilient mounting spring attached by means of two metal rivets 29 at the opposite end of the base, and a diagonally flanged portion 31 of sheet metal at the opposite end also. The cut-out portion 27 at the end of the tail portion provides an opening for receiving the terminal bolt 16 and against which a lock nut can be tightened.

The two metallic connectors 25 and 26 are identical in structure except for the two portions 32 in the cut-out portion 28 of the arm of metallic connector 26 which two portions 32 bend back at their base to provide a locking feature for the square nut. The two metallic connectors 25 and 26 are reversibly positioned when assembled so that there is a tail portion extending outwardly in opposite directions as shown in FIG. 1. In this way, the electrode 12 is connected through connector 25 to the terminal 15; whereas, the electrode 13 is connected through connector 26 to the terminal 16.

Figure 4:
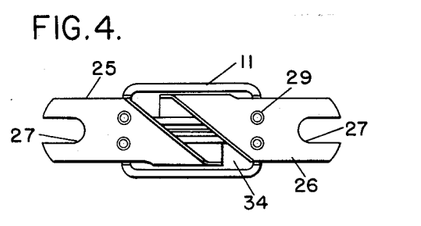
FIG. 4 is a bottom plan view of FIG. 1 and shows the electrical surge bypass unit connectors held in their housing by metal resilient springs.

With the parts in the positions as above described, a space 34 is provided between the diagonally flanged portions 31 of the bases of the two metallic connectors 25 and 26 as can best be seen in FIG. 4. This space 34 allows any condensation formed on the inner walls of the glass housing 11 to be evaporated or to drop out at the bottom of the housing. This space also provides for the movement of air which may occur as a result of disruptive discharges between the metal electrodes and thus prevent the glass cover 11 from being blown off.

Although there may be several explanations of theories as to the electrical phenomena involved in the operation of the surge bypass unit of the present invention, it is believed that one explanation should be given to more clearly point out what are believed to be the advantages and characteristics of its structure. More specifically, and with reference to FIG. 3, the presence of a potential between the metal electrodes 12 and 13 tends to produce a current flow through the semiconductor disc 14. At the relatively low voltage with which the unit is normally employed, the leakage through the semiconductor is insignificant for all practical purposes. For example, assuming the disc 14 to have a resistance in the order of 200 to 1000 ohms, the leakage through such resistance between the electrodes 12 and 13 in the track circuit organization of FIG. 7 can for all practical purposes be neglected, since the normal voltage between the electrodes 12 and 13 may be in the order of four volts.

However, when the potential between the electrodes 12 and 13 rises, the current flow through the semiconductor increases. The disc 14 being a semiconductor, has the usual characteristics in that the increase of current flow therein causes a decrease of resistance. In addition, the carbon particles in the pores of disc 14 adjacent its surface and the carbon particles forming a coating over its surface create a path of much lower resistance along the surface of the disc 14. Thus, the increase of potential between the electrodes 12 and 13 increases the current flow along this surface path. Obviously, if the potential rises to a substantial value the current through this surface path will be of a substantial value.

The flow of current along the surface of the disc 14 through the carbon coating produces a movement of electrons bombarding the molecules of the adjacent air to cause them to ionize and allow a disruptive current discharge between the surfaces 20 and 21 of the metal electrodes 12 and 13. The critical potential value at which such a disruptive discharge can be produced is much lower than the value that would normally be required in the absence of a semiconductive disc or in the presence of the semiconductive disc without the coating provided in accordance with the present invention.

For example, laboratory experiments have been conducted involving the combination of circumstances discussed above and photographic records made. Using these photographic records, the graphs of FIGS. 8A, 8B, 8C, 9A, 9B, 9C, 10A, 10B and 10C have been prepared to clearly illustrate the operation of the present invention.

Figure 8A:
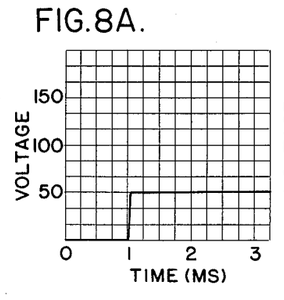
FIGS. 8A, 8B and 8C shows three graphs of voltage versus time for an electrical surge bypass unit having two metallic electrodes separated by an air space.
Figure 8B:
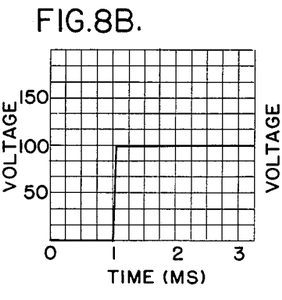
Figure 8C:
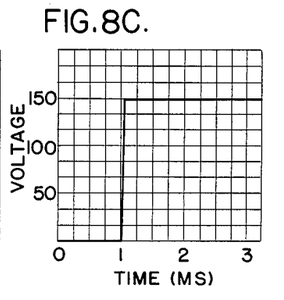

FIGS. 8A, 8B and 8C illustrate what happens when two metal electrodes are separated by an airgap without semiconductive disc and electric surges of 50, 100 and 150 volts are applied to the electrodes. Under all three conditions, the voltage rapidly rises from zero to the applied voltage and remains at the voltage over a protracted time since the voltage is insufficient to cause a disruptive discharge between the electrodes and since the leakage paths between the electrodes are all very, very high because of the insulating qualities of the wires and the supporting parts. So far as the short time of two milliseconds is concerned, there is no dissipation of the charges involved.

Figure 9A:
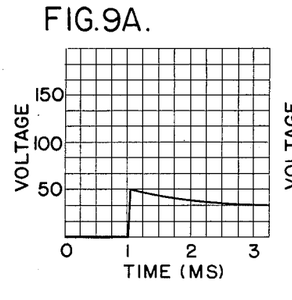
FIGS. 9A, 9B and 9C show three graphs of voltage versus time for an electrical surge bypass unit having two metallic electrodes separated by an untreated auxiliary electrode of a semiconductive material.
Figure 9B:
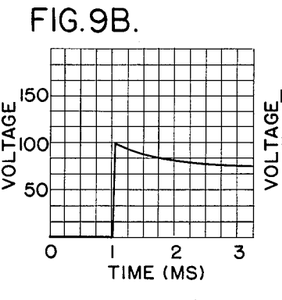
Figure 9C:
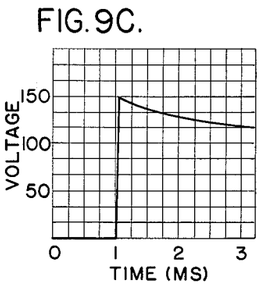

Referring to FIGS. 9A, 9B and 9C, the same electrodes were employed separated by similar discs of semi- them but separated by an untreated disc of semiconductive material having a normal resistance in the order of 200 ohms. The application of the three different test surges of 50, 100 and 150 volts respectively showed that the voltage between the electrodes rose rapidly to the applied voltage but began to taper off or dissipate even during the short time of two milliseconds. The higher the voltage of the applied surge, the more rapidly the surge began to dissipate through the leakage supplied by semiconductive material between the electrodes. However, no disruptive discharge occurred between the metal electrodes.

Figure 10A:
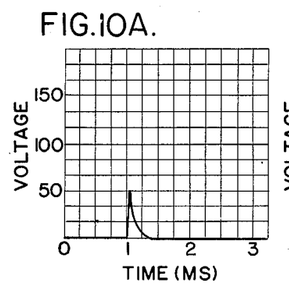
FIGS. 10A, 10B and 10C show three graphs of voltage versus time for an electrical surge bypass unit having two metallic electrodes separated by an auxiliary electrode of a semiconductive material treated or formed in accordance with the present invention.
Figure 10B:
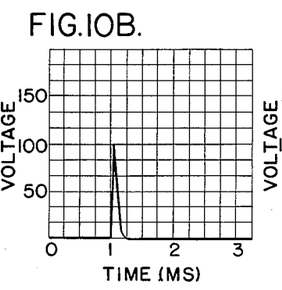
Figure 10C:
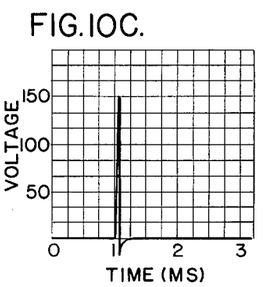

Referring to FIGS. 10A, 10B and 10C, similar electrodes were employed separated by similar discs of semiconductive material but having their exposed surfaces coated with a colloidal graphite solution above specifically identified as Dag-Dispersion No. 154. Such solution was applied to the exposed surface of the disc of semiconductive material and allowed to dry. The application of an electrical surge or charge of 50 volts to the metal electrodes as illustrated in FIG. 10A, showed that the potential across the metal electrodes quickly rose to the voltage of the applied surge or charge but quickly dissipated by a disruptive discharge to zero between three and four-tenths of a millisecond.

In FIG. 10B, the application of a surge or charge of 100 volts caused the potential across the metal electrodes to quickly rise to that value and then to rapidly dissipate by a disruptive discharge to zero in approximately twenty-five hundredths of a millisecond.

The application of a surge or charge of 150 volts as illustrated in FIG. 10C shows that the voltage between metal electrodes quickly rises to the applied voltage and then almost instantaneously wholly breaks down to allow the discharge to dissipate in an oscillatory fashion, if it has that characteristic, and to reduce the potential across the metal electrodes to substantially zero in something less than twenty-five hundredths of a millisecond. It is clearly obvious that electrical apparatus can be built which will withstand substantial electrical surges and charges which are dissipated within such short intervals of time; whereas, similar voltage surges or charges existing for times illustrated in FIGS. 8 and 9 would obviously be detrimental and destructive of the apparatus.

It is, of course, contemplated that the electrical surge bypass unit of the present invention may be used in a large number of different practical applications, and in fact anywhere that a device is required to be protected from electrical surges due to lightning strokes or electrical surges which are due to switching or control operations, which are sometimes termed electrical static. For example, in switching from one source of power to another or the removal of power from a control line causes the magnetic field in the various intermediate transformers to collapse. The collapse of such magnetic field, of course, creates surges of electrical energy and in some instances these surges are greater than the associated apparatus can withstand.

Figure 7:
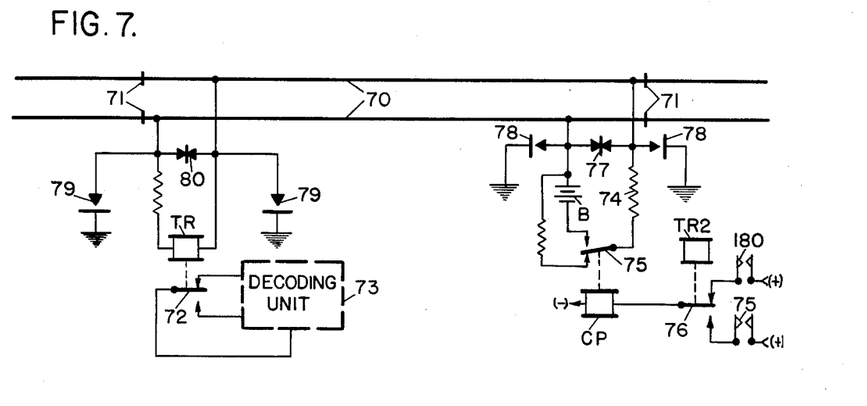
FIG. 7 shows diagrammatically a track circuit for railroads in which electrical surge bypass units are employed.

As one specific example, the electrical surge bypass unit of the present invention may be advantageously employed in coded track circuits used on railroads. A typical circuit organization is shown in FIG. 7 where the rails 70 are separated into a track circuit by suitable insulated joints 71. At the left-hand end of this track circuit, a track relay TR is connected across the track rails 70, which track relay TR through its contact 72 supplies the codes to a decoding unit 73. At the right-hand end of the track circuit, a battery B is intermittently applied across the track rails 70 through a limiting resistor 74 by the coded operation of contact 75 of the code transmitting relay CP. When the next section in advance is unoccupied as indicated by the energized condition of the track relay TR2, a 180 code rate is applied to the transmitting relay CP; but, when the track relay TR2 is deenergized due to the occupied condition of the track section next in advance, back contact 76 is closed causing a 75 code rate to be applied to the code transmitting relay CP.

Each time the code transmitting relay CP is released, back contact 75 closes a shunt circuit for draining any charge which may be present in the track circuit and thus makes the code pulses transmitted more distinct for reception by the track relay TR. This is because of the so called "storage battery affect" found in connection with railroad track circuits.

To provide adequate protection for the low resistance contact 75 a bypass unit 77 constructed in accordance with the present invention is connected directly across the leads connected to the track rails 70 from the battery B and contact 75. Each lead is also supplied with a suitable lightning arrestor, such as disclosed in my Patent No. 2,923,849, granted on February 2, 1960. These lightning arrestors 78 are connected directly to ground, but even though they are thus connected there is the possibility of potentials developing in the rails which are not equal and thus creating a potential difference which would cause current flow through contact 75 to an extent that would cause the fusing of the points.

At the other end of the track circuit, the track relay TR is protected by lightning arrestors 79 which may also be of any suitable type but preferably of the type disclosed in my Patent No. 2,923,849 entitled Lightning Arrestor" noted above. Although the track relay may have its windings so constructed as to be protected against potentials of relatively high value, such as in the order of 3000 volts, it is desirable to keep such potentials out of the relay structure where contacts may be closely spaced and unable to withstand such potentials should static discharges occur between their points. For this reason, an electrical surge bypass unit 80 constructed in accordance with the present invention is shown as connected between the wires leading from the track rails 70 to the track relay TR.

The type of track circuit illustrated in FIG. 7 is ordinarily operated in the range of 2, 4, or 6 volts so that the contact 75 must be of very low resistive material such as a rare metal type of contact point which would be very subject to fusing should such contact be overloaded. Thus, the surge bypass units 77 and 80 are preferably constructed to protect against electrical surges as above explained and in fact to actually cause a surge to be discharged between its metal electrodes should it exceed approximately 100 volts. However, the surge bypass unit of the present invention shortens the existence of such surge to such a short time as explained in connection with FIGS. 10, that the current flow due to that surge does not become harmful even to relatively low voltage contacts.

The lightning arrestors 78 and 79 are assumed to be of the type above mentioned which will permit disruptive discharges and dissipation of a lightning surge when its potential exceeds five or six-hundred volts.

It is also to be understood that the connections to the rails for adjoining track circuits may also be interconnected with surge bypass units so that the potential strain on the insulated joints between track circuits will be minimized and less likely to break down. This has not been shown since the operation of the surge bypass units is the same as described in connection with the units 77 and 80.

Figure 11:
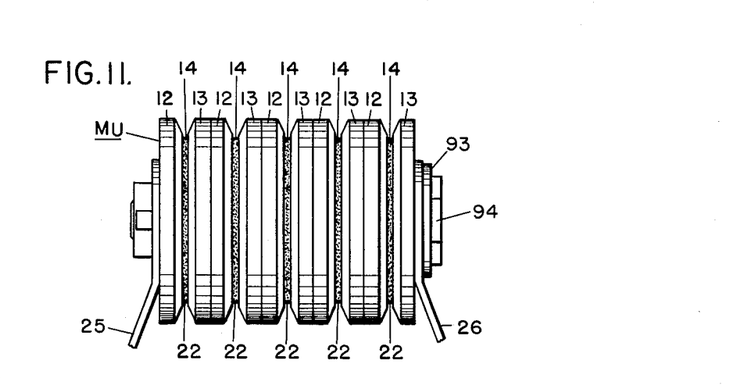
FIG. 11 is a side elevational view showing a plurality of electrical surge bypass units connected in series to form a multiple unit bypass device for power lines.

A further feature of the present invention is that the surge bypass units above described may be connected in series in any desired or suitable number to provide what may be conveniently termed a multiple unit electrical surge bypass device. Such a device MU has been illustrated in FIG. 11 of the drawings showing five electrical surge bypass units connected in series. Each unit includes a pair of metal electrodes 12 and 13 separated by a disc 14 all as described above. Each disc 14, of course, is coated with the colloidal carbon solution as above described providing the coating 22 on each disc 14. These units are all assembled on an insulating bushing and washer 93 with a bolt 94 supporting the connectors 25 and 26 in positions corresponding to that described in detail in connection with FIG. 3. This form employs semiconductor discs 14 of suitably selected resistances the same as described in connection with the discs 14 of FIG. 3. In brief, the resistances may range in the order of 200 to 1000 ohms depending upon the percentages of the ingredients used in the composition of the semiconductive material employed. The particular resistance is selected dependent upon the service in which the device is to be used. Also, the spacing between the pairs of metal electrodes may be selected dependent upon the service in which the multiple unit surge bypass device is to be employed.

Figure 12A:
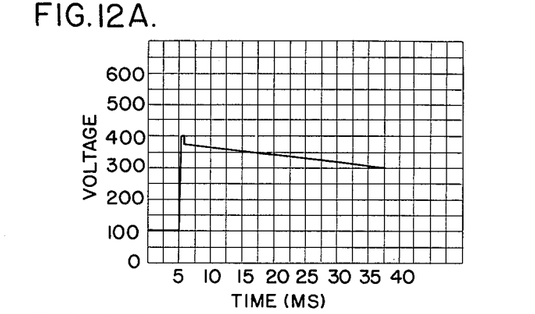

The operation of the multiple unit device MU is in theory the same as described above for a single unit. Such a device MU has been tried in the laboratory and photographic records have been made of its operation. Graphs of such operation are provided in FIGS. 12A, 12B and 12C approximating the photographic record. The FIG. 12A shows that the application of a 400 volt surge or charge causes such a potential to build up between the outside or end metal electrodes and this surge or charge is gradually dissipated over a considerable period of time. However, it is apparent that during the observable period of a little over 30 milliseconds the potential had reduced some but a substantial potential of approximately 300 volts still existed between the extreme metal electrodes.

Figure 12B:
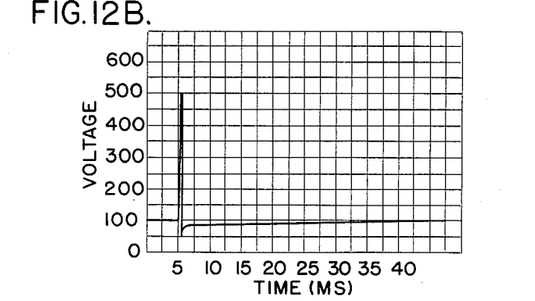

FIG. 12B illustrates the operation upon the application of a surge or charge of approximately 500 volts. This graph shows that the potential between the end metal electrodes (i.e. the metal electrodes 12 and 13 at the extreme right and left hand ends of the multiple unit MU in FIG. 11) quickly rose to the approximate 500 volts and then an immediate disruptive discharge took place between the metal electrodes of the multiple unit device dissipating the charge to zero, which charge then swung to a negative value of approximately 50 volts and then gradually died out to a zero value. It is assumed that the swing to the negative value is due to reactive characteristics of circuits involved.

Figure 12C:
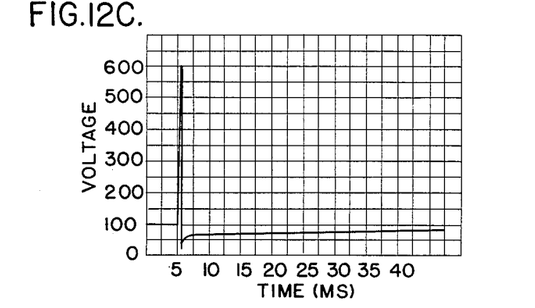

Referring to FIG. 12C, it will be noted that a surge or charge of 600 volts applied to the multiple unit MU resulted in the quick rising of the potential at the opposite ends of the multiple unit device but the air space between the pairs of metal electrodes quickly ionized to allow the charge to dissipate by a disruptive discharge. However, at this voltage the swing to negative value was slightly higher but gradually dissipated toward zero.

Figure 13:
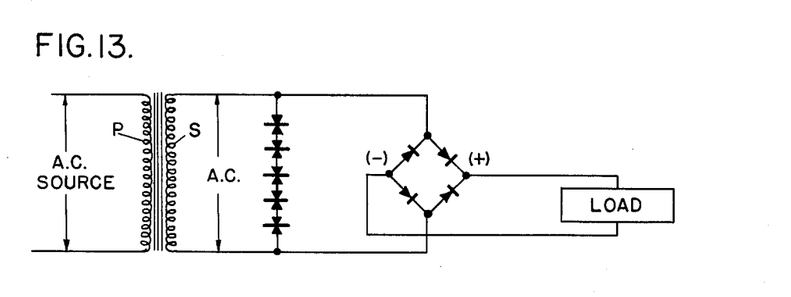
FIG. 13 diagrammatically illustrates a rectifier circuit employing the multiple unit bypass device of FIG. 11.

Let us consider that the multiple unit device MU is connected across the secondary winding of a step-down transformer having primary winding P and secondary winding S as shown in FIG. 13. This secondary winding S supplies an alternating current voltage to a rectifier which in turn supplies a direct current voltage to the load device. It is well known that rectifier devices, especially those of the dry plate type, cannot be subjected to extreme surges of potential without breaking down and becoming inefficient and in some cases inoperative. If the step down transformer is of a relatively high capacity it is obvious that the application and removal of power from its primary winding P would result in a substantial potential surge in its secondary winding during the rise or fall of the magnetic flux in its core.

The multiple unit device MU connected across the secondary winding furnishes a bypass for any surges created in such winding due to either lightning strokes or the application and removal of power. The normal leakage through the multiple unit device MU is very low compared to the normal amounts of power required for the magnetization of the transformer and operation of the load devices. This can, of course, be controlled by selected discs 14 having an appropriate normal resistance.

It is apparent from the above discussion that if the secondary winding S were to provide an effective voltage of a 110 volts A.C., that such voltage would not cause any substantial leakage through the multiple unit device since all of the discs 14 are in series, and if their resistances were selected as being in the order of 1000 ohms, there would be a total of 5000 ohms in series across the secondary winding S.

However, the presence of a surge of slightly over 400 volts or more would cause the occurrence of a disruptive discharge between the metal electrodes of the multiple unit device dissipating the potential to a value that would be of no harmful significance to the devices of the circuit involved. Assuming that the spacing between the pairs of metal electrodes is in the order of twenty-five thousandths of an inch for each pair, it is then readily apparent that any presence of a power follow-through current upon the occurrence of a disruptive discharge is quickly broken. In other words, the multiple unit surge bypass device of the present invention not only serves to protect devices from surges because of their possible break down, but also protects the power equipment because upon the occurrence of such surges and their dissipation, power follow-through currents are prevented.

Figure 6:
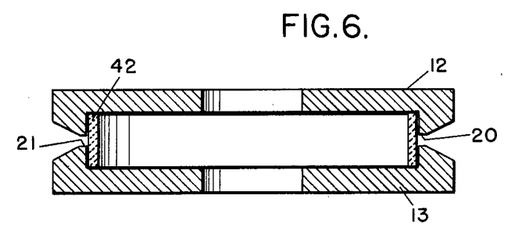
FIG. 6 is a modified form of the present invention and shows an enlarged view of the metal electrodes having a narrow ring of semiconductive material placed between the two metal electrodes.

Another form of the present invention is shown in FIG. 6 where the metal electrodes 12 and 13 are constructed the same as discussed in connection with FIG. 3 but instead of using discs 14 of semiconductive material, a ring 42 of semiconductive material is employed. This ring 42 is of such a width as to provide the proper spacing between the metal electrodes as required for the particular service in which the electrical surge bypass unit is to be employed. However, this ring is of a suitable thickness so as to cause the current flow present upon the existence of abnormal surge voltages to be close to the surface and on the exposed surface of the ring 42 upon the occurrence of critical potentials so as to ionize the air space between the surfaces 20 and 21 of the metal electrodes the same as described in connection with FIG. 3. This form is shown to illustrate that the scope of the present invention contemplates that the form of the semiconductive material may take different shapes in order to facilitate the flow of current along the surface of its material adjacent the air space between the protective metal electrodes.

It should be understood, however, that should this particular shape of the semiconductive material shown in FIG. 6 be insufficient to bring the initial break down or critical voltage to the desired value, its exposed surface may be coated with a colloidal carbon solution the same as described in connection with FIG. 3.

It should be understood that the theory of operation and the performance of the bypass unit structure shown in FIG. 6 is similar to that described above in connection with FIG. 3 so that further discussion will not be continued of this particular modified form.

In the above description and the drawings, the electrodes 12, 13 and 14 are shown as being circular in form. Such form has been particularly selected because of the practicality of providing tools for manufacturing such a form; but it is to be understood that the electrodes could be of any suitable configuration such as square, rectangular, triangular, or the like.

In the above description, the discs 14 semiconductive material have been assumed to have ohmic resistance in the order of 200 to 1000 ohms; but, it is to be understood that discs of higher resistance may be employed if it is desirable to reduce the leakage current. In fact, the discs 14 may be made of a porous insulating material such as linen or paper laminated phenolic resin product. A disc of this material is inserted between the metal electrodes in the same way as described for the semiconductive material. Its exposed periphery is then coated with a colloidal solution of carbon as above described. The operation of this form is in general very similar to that described above except that the leakage currents are extremely small.

*Treating method*

It has been described above how the desired operating characteristic of the surge protection device of this invention may be obtained by coating the edge of the semiconductor element with a graphite suspension, thereby increasing the electrical conductivity of that portion of the surface of the semiconductor element which bridges the gap between the two electrodes. Although it has been found in practice that this method works well, it does nevertheless require that care be used to deposit the proper amount of graphite on the semiconductor element. If not enough is deposited, there will then be no ionization of the air so as to initiate an arc discharge until the voltage applied to the electrodes substantially exceeds that at which such discharge is desired to occur. On the other hand, if too thick a film of graphite is applied, it is true that an arc discharge will be initiated for lower values of voltage applied to the electrodes but there is at the same time an undesired effect, namely, that of substantially reducing the resistance provided by this device at times when no arc discharge is occurrig. In many applications, this latter result is strenuously to be avoided since the connection of a low resistance in parallel with many load devices adversely affects their operation.

It is, therefore, sought according to this modification of the invention to provide a method of treatment whereby a surge protection device may result wherein an arc discharge will occur for lower voltages applied to the electrodes and yet the overall resistance of the device will be maintained at a satisfactorily high level.

According to this method, the surge protection device of this invention is constructed generally according to the manner disclosed in FIGS. 1–6 and as described above, but no graphite colloidal solution is applied to the semiconductor disc 14. It follows from the description previously given that such a surge protection device will not provide an arc discharge except for relatively high surge voltages applied to the two electrodes 25 and 26, which voltages are considerably in excess of those at which it is desired that the device should discharge. At the same time, the device may be constructed with a semiconductor disc having somewhat lower resistance than would be provided if it were contemplated that the graphite suspension would be applied. The reason for this is that the method of treatment to be disclosed herein not only causes the device to discharge for lower surge voltages applied to the electrodes but concurrently produces the effect of increasing the resistance of the device. Therefore, one may start out with a device having lower resistance between the electrodes than will be permissible in operation and yet, after subjecting the device to the treatment described here, the end product will not only have the desired breakdown characteristics described in connection with FIGS. 10A, 10B and 10C but will have the desired high resistance values as well.

The method of treatment contemplated by this modification of the invention comprises connecting the electrodes of the surge protection device of FIG. 3 to a source of repetitive high voltage surges. Such source may be an alternating-current potential whose peak amplitude is in excess of that required to cause the device to discharge at the time the treating process is begun. Preferably, some means should be employed to limit the maximum current that will flow upon each occurrence of the discharge. It has been found in numerous tests that a maximum discharge current of 5 amperes will produce satisfactory results. Values of discharge current which are much below this value tend to slow the treatment time unnecessarily; whereas current values much in excess of 5 amperes have been found to result in excessive burning of the various contact points in the device as, for example, between the electrodes and the semiconductor element. It has also been found that a 60 cycle frequency may be employed as the source of the repetitive high voltage surges to be applied to the electrodes. Such a frequency permits sufficient successive discharges in a given interval of time that the treatment may be carried out to give the desired operating characteristics within a reasonably short length of time.

As has previously been mentioned, the protective device of this invention is ordinarily intended to fill certain definite specifications, i.e., it must provide a discharge between the electrodes for all values of voltage in excess of some predetermined maximum value and also the total resistance between electrodes must exceed some minimum value when the device is in a nondischarging condition. Accordingly, the method of treatment herein described contemplates a convenient and practical manner of determining when sufficient discharges have occurred between the electrodes. This is accomplished by connecting the device, after an interval during which it has been applied to the source of high voltage surges for some predetermined interval, to a source of regulated direct-current voltage whose amplitude substantially equals the level of voltage at which the device should discharge. In other words, the device is connected for a short interval to the alternating-current source and subjected to a plurality of discharges. Thereafter, it is connected to the source of direct-current voltage, and it is observed whether or not a discharge then takes place. If no discharge takes place, this is an indication that the breakdown characteristics are still not proper in that a discharge will not occur at the specified voltage. It is then necessary to connect the device again to the alternating-current source and subject it to additional repetitive discharges. It is then connected again to the source of direct current, and this procedure is followed for as long as is required in order to obtain a discharge between the electrodes when the device is connected to the source of regulated direct-current voltage.

The above method by itself does not ensure however that the device will have the proper resistance characteristics when not discharging. Under those circumstances, when it is desired that the resistance be above some predetermined minimum value, it is then necessary to provide a means of measuring resistance such as an ohmeter. After obtaining the desired breakdown characteristics in the manner just described, the device is then connected to the resistance measuring means to ascertain the value of its resistance. If the resistance is below the predetermined minimum value, it is then necessary to connect the protective device of this invention again to the source of alternating current discharges. Such additional discharges do not only have the effect of reducing the voltage level at which an arc discharge will take place but also increase the overall resistance of the device. It is believed that such increase of resistance occurs as a result of a burning effect in the contact area between the semiconductor disc 14 and the respective electrodes 12 and 13. Regardless of such conjecture as to the theoretical reasons behind such increase of resistance, it is an observed fact that the subjection of the device to the additional discharges tends to increase its overall resistance although it at the same time also decreases the voltage at which an arc discharge will occur. In this connection, it will be recalled that the semiconductor material employed for the disc 14 preferably includes in its composition a suitable amount of "free carbon" in the form of powdered graphite or mineral black. Normally, this free carbon is distributed in the composition so that no conducting paths are formed therethrough, but in the presence of arc discharges as described above, the surface of the semiconductor disc 14 is burned or charred to the extent that small spots of free carbon form on the surface thereof. Repeated discharges cause the small spots or residue of free carbon to unite and form "carbon tracks" between the two electrodes 12 and 13. The carbon tracks thus formed provide high resistance conducting paths between the electrodes 12 and 13 adjacent the air gap between such electrodes, for allowing the current which flows therethrough to effect the ionization of the air gap.

Thus, the method of treatment disclosed herein contemplates that it is only necessary to subject the device to sufficient discharges to eventually cause the device to meet both of the specifications mentioned above, i.e., a discharge for voltages at or above the predetermined maximum value and a resistance when not discharging which exceeds the predetermined minimum value. Incidentally, it should be observed that the application of additional discharges to meet one of the specifications such as an increase in the overall resistance may at the same time tend to reduce the voltage level at which discharges will occur somewhat below that required but this is not ordinarily considered at all as a disadvantageous result. In other words, additional discharges tend to affect both of the characteristics in directions which result in more favorable operating characteristics. However, the method described here permits the desired operating characteristics to be reached in the shortest treatment time.

Figure 14:
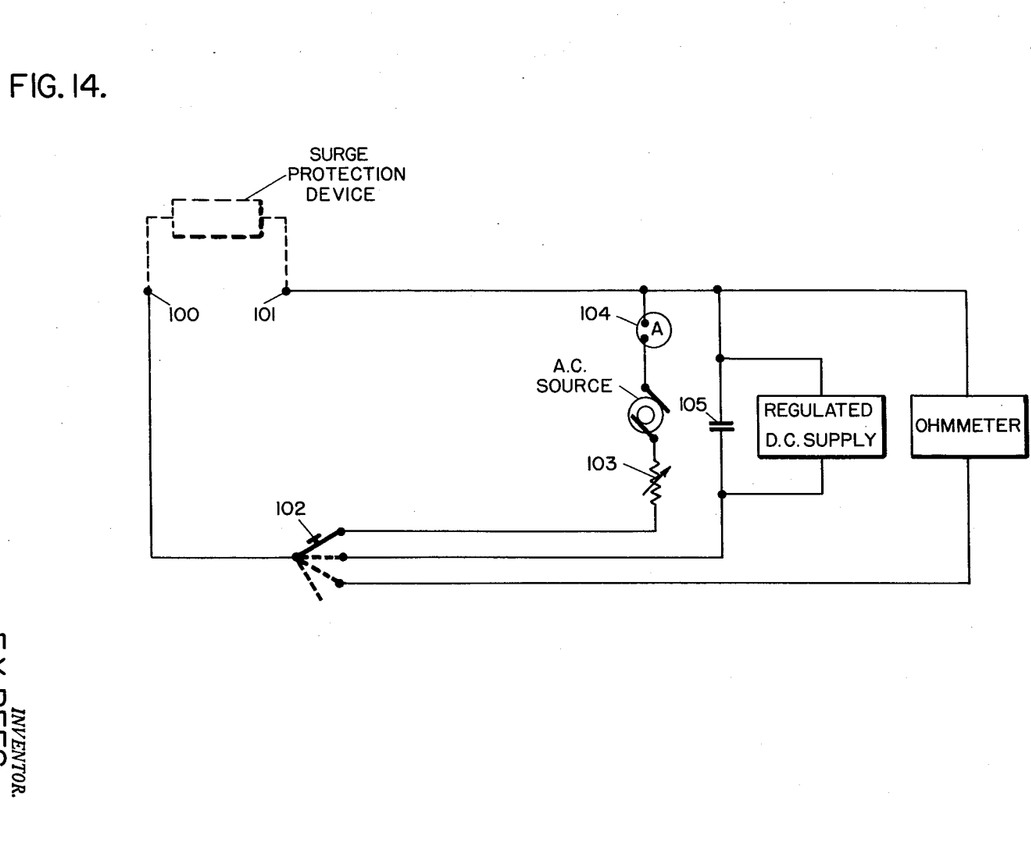
FIG. 14 diagrammatically illustrates apparatus for treating and checking the characteristics of an electrical surge bypass unit.

FIG. 14 illustrates diagrammatically the apparatus that has been employed to effect the method of treatment described above. Thus, the surge protection device as disclosed, for example, in FIG. 3, may be connected to the terminals 100 and 101. A multiposition switch 102 is provided which, in its uppermost position, connects the terminals 100 and 101 across a series combination including an alternating-current source, a variable resistor 103 and an ammeter 104. With the switch 102 in this position, it is obvious that the surge protection device will have applied to it the output voltage of the alternating-current source. The variable resistor 103 is provided so that the amplitude of the current on each successive discharge may be regulated to a preselected value such as the 5 amperes mentioned above, and the ammeter 104 provides a means of measuring the maximum discharge current.

As described above, after the surge protection device has been subjected to repeated discharges, as when switch 102 is in the uppermost position, it is then desired to connect the device to a source of regulated direct-current voltage. This is accomplished with the apparatus of FIG. 14 when the switch 102 is moved to its second position since then the terminals 100 and 101 are connected to such regulated direct-current voltage supply and to capacitor 105 having the desired charge thereon. As already described, it is intended that observation should be conducted when the switch is operated to this intermediate position to determine whether a discharge takes place. If such discharge does then take place, this is an indication that the device will then discharge for voltages at or above the level at which the device is intended to provide an arc between the electrodes.

Operation of the switch 102 to its third position connects the terminals 100 and 101 across a resistance measuring device such as an ohmmeter. This permits the measurement of the overall resistance of the surge protection device. As described above, if the ohmmeter indicates that the resistance is below the desired minimum value, it will then be necessary to again operate switch 102 to its uppermost position so that additional discharges can be applied. After each short interval that additional discharges are caused to occur by reason of placing the switch 102 in the uppermost position, the switch is operated to its third position so that a measurement of resistance can again take place and this process is repeated until the required minimum value of resistance is obtained or exceeded. Contact 102 in its fourth position opens the circuit for substitution of another unit for treatment.

As has previously been described, the preferred embodimnt of this invention makes use of a semiconductor material for the disc 14 placed between the two electrodes. The principal advantage resulting from the use of such a semiconductor material is that it permits the dissipation of a charge appearing across the electrodes under those circumstances where the applied voltage is below that which will effect an arc discharge. When a material is used which does not have semiconductor characteristics, the application of a relatively high voltage surge across the terminals results in this voltage being maintained for a considerable time thereafter. However, when semiconductor material is used, the voltage between the electrodes is rapidly diminished in amplitude when the applied voltage is removed, and this results entirely because of the unusual characteristics of the semiconductor material which cause its resistance to decrease with higher current values passing therethrough. Thus it is the combination of the use of the semiconductor material together with the increased electrical conductivity of its outer surface as compared to the inner portion thereof which makes possible this rapid dissipation of a charge where the amplitude of such charge will not effect an arc discharge between the electrodes and also makes possible the highly desirable characteristic that the current density in the outermost portion of the semiconductor element will greatly aid in initiating the arc discharge for voltage at or above that which are effectiveto do so.

Having described an improved device for the protection of electrical loads against high voltage surges and also a method of treating such a device in order to obtain desired operating characteristics, I desire it to be understood that various modifications, adaptations, and alterations may be made to the specific form of my invention shown and described without departing in any manner from the spirit or scope of this invention.

What is claimed is:

1. The method of manufacturing a lightning arrester comprising the steps of, interposing between two spaced electrodes a semi-conductor element in contact with both said electrodes and formed of an electrically insulating binder containing a dispersion of free carbon particles, treating said semi-conductor element by repeatedly applying an electro-motive force to said terminals having a magnitude in excess of that required to produce a discharge between said terminals and across the surface of said semi-conductor element, and continuing the application of said electromotive force to said terminals until the breakdown voltage between said terminals and across said semi-conductor elements stabilizes at a predetermined voltage less than the minimum breakdown voltage prior to said treating step.

2. The method of claim 1 wherein said treating of said semi-conductor element is effected by applying said electromotive force in the form of an alternating-current potential having a peak amplitude at least equalling the breakdown voltage between said terminals and across said semi-conductor element.

3. The method of manufacturing a lightning arrester having a breakdown voltage not exceeding a predetermined value and a resistance when not discharging which is in excess of a predetermined minimum value comprising the steps of, (a) bridging two closely-spaced electrodes with a semi-conductor element formed of a finely-ground Portland cement binder containing a dispersion of free carbon and with said semi-conductor element in intimate electrical contact with both said electrodes, (b) treating said semi-conductor element by repeatedly applying to said terminals an electromotive force having a magnitude in excess of that required to produce an electrical discharge between said terminals and across the surface of said semi-conductor element, (c) thereafter applying to said terminals an electromotive force of a magnitude substantially equalling the minimum desired breakdown voltage of said lightning arrester, (d) measuring the ohmic resistance between said terminals, and continuing with the treating step (b) until a discharge takes place across said terminals when said predetermined breakdown voltage is applied thereto in accordance with step (c) and until also the ohmic resistance measured in accordance with step (d) at least equals said predetermined minimum value.

4. A method of treatment to be used in the manufacture of an electrical device having at least two terminals and adapted to discharge momentarily between said terminals whenever the voltage applied thereto exceeds a predetermined maximum value but also adapted to have a resistance between said terminals when not discharging which exceeds a predetermined minimum, said device being of the type which includes at least two spaced electrodes respectively connected to said terminals and also includes a semi-conductor element connected to and bridging said electrodes and containing at least near the surface of that portion thereof which bridges said electrodes a dispersion of carbon particles and with the spacing of said electrodes and the conductive characteristics of said semi-conductor element being so selected that a discharge will occur between said terminals only for voltages applied thereto which are in excess of said predetermined maximum voltage, said method of treatment comprising the repeated application of pulses of voltage between said electrodes with an amplitude great enough to produce an electrical discharge between said terminals and continuing the application of said voltage pulses until discharge occurs at all voltages exceeding said predetermined values, whereby said method of treatment not only simultaneously lowers the voltage level at which said device will discharge to said predetermined maximum value and increases the non-discharging resistance between said terminals to at least said predetermined minimum value but also causes said device thereafter to always discharge at substantially said predetermined maximum value.

5. In an electrical surge protection unit adapted to be connected in shunt with a load device which is to be protected thereby and to discharge abruptly when the voltage across said device exceeds a predetermined maximum breakdown voltage, said unit being of the type which has at least two spaced electrodes each adapted for connection to a respective opposite terminals of said protective device and with the gap between said electrodes bridged by a semi-conductor element connected to each said electrode and comprising a dispersion of fine carbon particles throughout a binder, said unit being constructed with a spacing between said electrodes and an electrical conductivity for said semi-conductor element such that a discharge between said electrodes occurs only in response to a voltage applied thereto that substantially exceeds said predetermined breakdown voltage: the improvement in the manufacture of such units which resides in the method of treatment of said unit comprising the repeated application to said terminals of a voltage whose amplitude exceeds the existing breakdown voltage so that repeated discharges occur between said terminals and across the surface of said semi-conductor element, and continuing the last-mentioned step until the breakdown voltage has been reduced to at least said predetermined breakdown voltage; whereby said treatment has the simultaneous effect of reducing the breakdown voltage amplitude and of increasing the electrical resistance betwen said terminals when not discharging.

No references cited.

RICHARD H. EANES, JR., *Primary Examiner.*